April 16, 1940.           A. T. STUART           2,197,085
PROCESS FOR TREATING SIDERITE
Filed Oct. 13, 1937
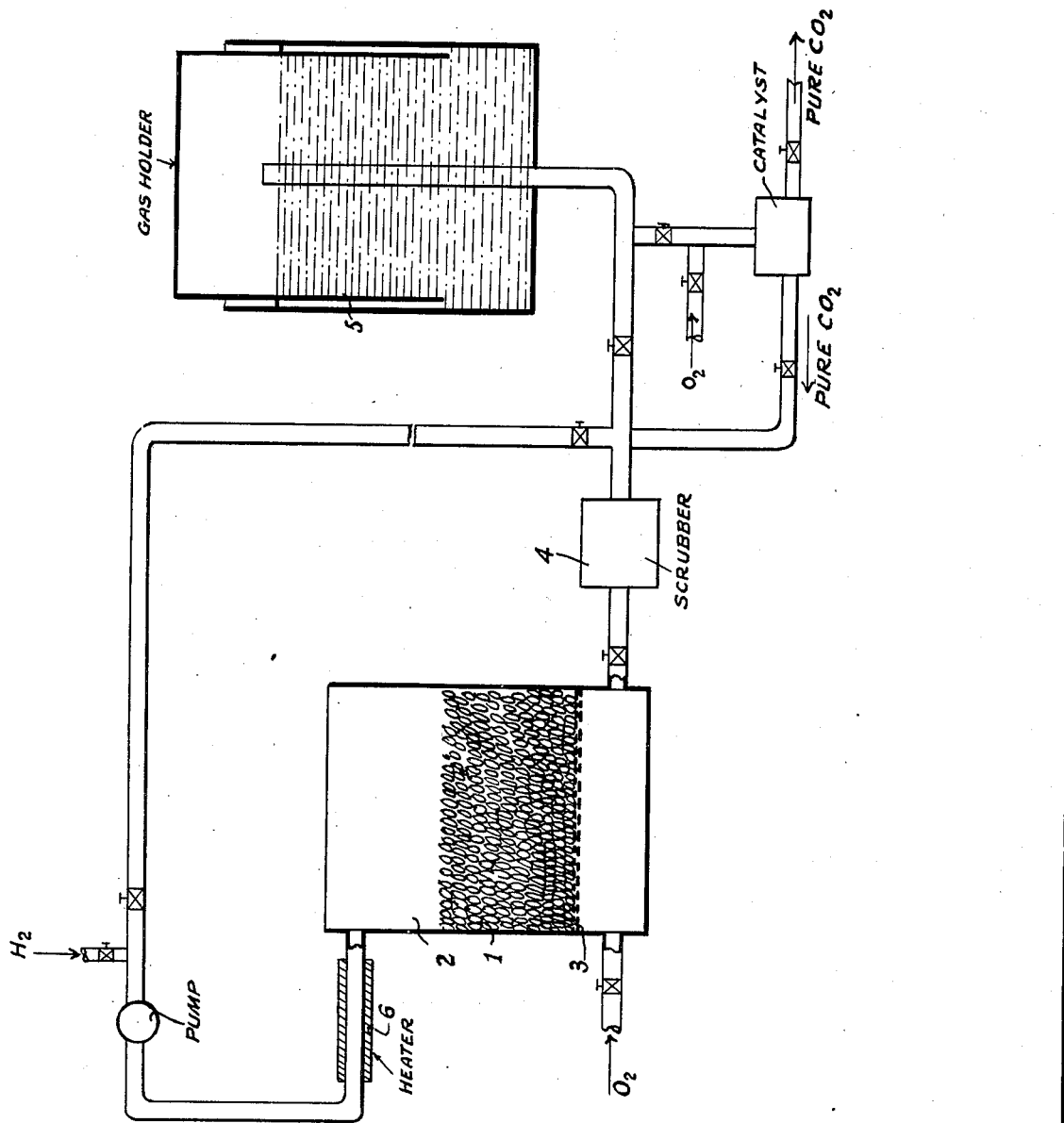
ALEXANDER T. STUART.
INVENTOR
ATTORNEY.

Patented Apr. 16, 1940

2,197,085

UNITED STATES PATENT OFFICE 2,197,085

PROCESS FOR TREATING SIDERITE

Alexander Thomas Stuart, Forest Hill Village, Ontario, Canada

Application October 13, 1937, Serial No. 168,771

6 Claims. (Cl. 75—34)

My invention relates to a process for treating siderite ore and is particularly directed towards providing a process wherein the siderite may be broken up into its several constituents at an operating cost and resulting purity and concentration heretofore considered impossible to realize.

Siderite is an ore of iron which in pure form is iron carbonate ($FeCO_3$), although in the form of ore it ordinarily contains sulphides and various gangue material.

One of the principal features of my invention resides in the manner in which the siderite is decomposed and the several constituents are recovered in a highly purified and concentrated state.

A further feature of my invention resides in the manner in which I convert what originally were considered as diluents, requiring costly treatment to separate them, into valuable by-products having a widespread commercial market.

The manner in which I attain these and other features of my invention will be apparent from the following description and accompanying drawing in which the preferred embodiment of my invention is shown schematically.

Like reference characters refer to like parts throughout the specification and drawing.

The numeral 2 indicates a closed receptacle such as a shaft or retort furnace suitably connected by conduits to the scrubber 4 and the gas holder 5. Provision is made for recirculating and heating a portion of the gases evolved during decomposition of the siderite.

I first heat the ore, preferably in a closed receptacle such as a retort, to a temperature of approximately 1200 degrees F., or slightly above, at which temperature the siderite decomposes into iron oxide and carbon dioxide as expressed in the following equations:

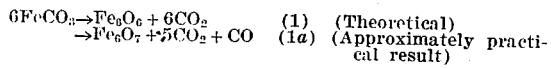

$6FeCO_3 \rightarrow Fe_6O_6 + 6CO_2$ (1) (Theoretical)
$\rightarrow Fe_6O_7 + 5CO_2 + CO$ (1a) (Approximately practical result)

The gaseous products are separately withdrawn from the charge under treatment and may be purified by any of the known means dependent on the impurities contained therein, after which the oxides of carbon are collected in substantially 100% concentration and are converted into pure carbon dioxide which, when liquefied or solidified, is a valuable marketable commodity.

In the specific embodiment of my invention described hereinafter, I disclose a method of treating the ore in intermittent charges such as by the retort method but it will be apparent that, with minor modifications, the process may be adapted for continuous operation such as in a rotary kiln or a continuous shaft kiln.

The siderite is charged into the retort 2 in which the siderite rests on the grate 3.

The interior of the retort 2 is heated to a sufficiently high temperature to begin the decomposition of the siderite into iron oxide and oxides of carbon. While the preheating may be effected in any one of several ways, I prefer to inject substantially pure oxides of carbon heated to a temperature sufficiently high to establish the necessary reacting temperature within the retort.

The oxides of carbon formed in the decomposition of the siderite are separately evacuated from the retort and their sensible heat is recuperated by known methods. The cooled gas is then drawn into the scrubber 4 wherein the impurities, such as sulphur dioxide, are removed and the carbon dioxide in substantially pure form, with the exception of a percentage of carbon monoxide, is passed into the gas holder 5.

Part of the mixed gas in the gas holder 5 may be withdrawn therefrom and returned to the retort 2. I have found that this gas, preheated to a sufficiently high temperature, may be returned to the retort 2 and utilized therein to convey heat thereto and maintain the necessary temperature within that retort. While the recirculated gas may be preheated in any one of several different ways, I have found, by heating it electrically, as at 6, the desired results are obtained without contamination of the final products.

In operation, the ore in the retort 2 reaches the temperature at which oxides of carbon are released and iron oxide is produced.

Carbon dioxide is an oxidizing agent and converts the FeO into $Fe_6O_7$, $Fe_3O_4$ or $Fe_2O_3$, depending upon specific conditions of temperature, pressure, etc., forming an equivalent amount of carbon monoxide. In addition, carbon dioxide may oxidize iron sulphide into iron oxide and sulphur dioxide. Consequently, the gases formed from the ore may contain, in addition to carbon dioxide, some carbon monoxide, sulphur dioxide and sulphur trioxide. These oxides of sulphur constitute the impurities in the carbon dioxide-carbon monoxide gas and may be removed and recovered therefrom by any one of the known methods leaving behind a mixed gas consisting substantially of carbon dioxide-carbon monoxide. I have found that satisfactory results are obtained in the operation of my process by recirculating and recovering this gas which may contain approximately 85 percent carbon dioxide and 15 percent carbon monoxide.

Part of this carbon dioxide-carbon monoxide gas may be heated and recirculated to the retort 2. When it is used for this purpose, however, I prefer to remove substantially all the impurities therefrom in order to avoid, as far as possible, the contamination of the carbon dioxide-carbon monoxide exit gas from the retort 2. In the alternative, the carbon dioxide-carbon monoxide gas may be treated prior to its recirculation with pure oxygen in order to oxidize the carbon monoxide to carbon dioxide and thereby recirculate substantially pure carbon dioxide instead of the carbon dioxide-carbon monoxide mixture.

The alternative treatment outlined in the preceding paragraph has a distinct advantage in that the oxidation of carbon monoxide to carbon dioxide is exothermic and the heat generated thereby serves to preheat the recirculated gas thereby decreasing the consumption of electrical energy.

The hot calcined ore remaining in the retort, inasmuch as the original ore ordinarily contains sulphides, still contains large percentages of the original sulphur in the form of ferric sulphide, ferrous sulphide or even as sulphates.

The hot calcine may be treated with a gas containing free oxygen in order to oxidize the sulphur, decompose any sulphates present and to superheat the gangue to incipient fusion resulting in a sinter suitable as feed to iron blast furnaces.

The latter step of the process begins after the original charge is decomposed into the iron oxide calcine and the oxides of carbon. The recirculation of the carbon dioxide or carbon dioxide-carbon monoxide gases to the retort is stopped and an oxidizing gas, such as air, oxygen enriched air, or a mixture of nitrogen and oxygen, is passed through the hot calcine. The temperature of the roast can be precisely controlled to obtain the desired quality sinter for blast furnace feed by regulating the oxygen ratio.

The roasting and sintering may be carried on in the same retort in which the decomposition step takes place, or they may be carried on in a different piece of apparatus by discharging the hot calcined ore from the retort 2 and feeding it into a second apparatus adapted for that purpose. Because the calcine is hot and contains combustible material in the form of sulphides, it is ignited by oxygen and sinters without the addition of any fuel.

Additional economies may be incorporated into the process by recovering the heat contained in the hot sinter or in hot exit gases by means of suitable heat exchangers. In theory, the whole process is exothermic and, if all the heat were recoverable, there would be no necessity of providing supplemental heat for the heating of the recirculating gases. Therefore, I make provision to minimize heat losses through the various steps of the process. I have found that the recirculated gases can be heated electrically most economically, inasmuch as the temperature thereof can be precisely controlled and all possibility of contamination of the final products is avoided.

The exit gases from either or both the calcining step or the oxidizing step are scrubbed and the contained sulphur is separated and recovered using any of the known absorbents, such as sulphites. Such sulphite solutions may be regenerated by expelling the sulphur dioxide and replenishing the reagent.

The carbon dioxide recoverable by my process is a valuable commodity and has a wide spread market such as in the form of dry ice. The excess raw gas, that is the mixed carbon dioxide-carbon monoxide gas after it has been purified and the portion taken for recirculation has been deducted, is converted into carbon dioxide by adding sufficient amounts of oxygen to oxidize the carbon monoxide content to carbon dioxide. For example, in 100 cu. feet of raw gas containing say 85 cu. feet of carbon dioxide and 15 cu. feet of carbon monoxide I add 7.5 cu. feet of oxygen. This mixture is not explosive but may be combined to form 100 cu. feet of substantially pure carbon dioxide over a heated element with or without a catalyst. If there is an excess of carbon monoxide or oxygen in the final gas the balance can be readily corrected by adding oxygen or carbon monoxide in the correct amounts or the excess may be removed by scrubbing.

As a further feature of my process, I may convert the siderite in one process into metallic iron by first decomposing the siderite and separating therefrom the oxides of carbon and sulphur as described hereinabove and thereafter establish a neutral atmosphere in the retort by the use of an inert gas such as nitrogen, to eliminate all the free oxygen. A preheated reducing gas, such as hydrogen or blue water gas, is injected into the retort and through the bed of hot calcined iron oxide thereby reducing it to hot sponge iron. When the reduction is complete, the hot sponge iron is transferred directly into an electric arc furnace, together with sufficient quantities of suitable fluxes to make a free running slag which is drawn off, leaving behind a high quality iron in molten state.

In the usual practice of sintering siderite ore, the ore is finely crushed and mixed with pulverized coke and water to form a paste, which is spread in the form of a bed say 8 inches deep over a pan having grates. The surface of the bed of paste is dried and ignited by means of a gas or oil flame and air is drawn down through the bed along with the oxides of carbon and sulphur released from the ore by the heat of combustion.

The hot oxides of carbon and sulphur released from the ore are so diluted with air and contaminated with the products of combustion that commercial recovery thereof is economically not feasible.

I have found in the operation of my process that it is not necessary to pulverize the ore nor to mix it with any carbonaceous fuel or other diluents but may be charged into the retort direct and the products recovered therefrom are in a very pure and highly concentrated state. These advantages result not only in a greatly decreased cost of recovering the iron oxide but in addition permit the recovery of valuable byproducts in the form of oxides of carbon and sulphur.

It will be clearly understood, of course, that modifications and departures may be made from the preferred embodiment of my invention described and illustrated herein without departing from the scope of the appended claims. For example, other carbonates may be treated in the same or similar manner for the recovery of carbon dioxide.

Having thus fully described my invention, what I claim as new and desire to secure by Letters Patent is:

1. A process for treating siderite ore which comprises heating the ore to and maintaining it at a temperature above its decomposition temperature by the action of circulating in contact therewith substantially pure oxides of carbon preheated to a temperature above 600° C., thereby releasing further oxides of carbon from the ore and maintaining an atmosphere consisting substantially of oxides of carbon; continuously withdrawing oxides of carbon from contact with the ore and purifying and separating the impurities therefrom; preheating a portion of the withdrawn gas and returning said preheated portion to the decomposition step of the process to maintain the requisite decomposition temperature of that step and separately withdrawing the decomposed solid residue.

2. A process for treating siderite ore which comprises heating the ore to and maintaining it at a temperature above its decomposition temperature by the action of circulating in contact therewith substantially pure oxides of carbon preheated to a temperature above 600° C., thereby releasing further oxides of carbon from the ore and maintaining an atmosphere consisting substantially of oxides of carbon; continuously withdrawing oxides of carbon from contact with the ore and purifying and separating the impurities therefrom; preheating a portion of the purified gas and returning said preheated portion to the decomposition step of the process to maintain the requisite decomposition temperature of that step and separately withdrawing the decomposed solid residue.

3. A process for treating siderite ore which comprises heating the ore to and maintaining it at a temperature above its decomposition temperature by the action of circulating in contact therewith substantially pure oxides of carbon preheated to a temperature above 600° C., thereby releasing further oxides of carbon from the ore and maintaining an atmosphere consisting substantially of oxides of carbon; continuously withdrawing oxides of carbon from contact with the ore and purifying and separating the impurities therefrom; preheating a portion of the withdrawn gas and returning said preheated portion together with oxygen to combine with the incompletely oxidized gases to the decomposition step of the process to maintain the requisite temperature of that step and separately withdrawing the decomposed solid residue.

4. A process for treating siderite ore which comprises heating the ore to and maintaining it at a temperature above its decomposition temperature by the action of circulating in contact therewith substantially pure oxides of carbon preheated to a temperature above 600° C., thereby releasing further oxides of carbon from the ore and maintaining an atmosphere consisting substantially of oxides of carbon; continuously withdrawing oxides of carbon from contact with the ore and separating the impurities therefrom; converting the carbon monoxide content of said purified gas into carbon dioxide and utilizing the heat generated during such oxidation to preheat a portion of the purified gas and returning said preheated portion to the decomposition step of the process to maintain the requisite temperature of that step and separately withdrawing the decomposed solid residue.

5. A process for treating siderite ore which comprises heating the ore to and maintaining it at a temperature above the decomposition temperature by the action of circulating in contact therewith substantially pure oxides of carbon preheated to a temperature above 600° C., thereby releasing further oxides of carbon from the ore and maintaining an atmosphere consisting substantially of oxides of carbon; continuously withdrawing oxides of carbon from contact with the ore and purifying and separating the impurities therefrom; preheating a portion of the purified gas and returning said preheated portion to the decomposition step of the process to maintain the requisite temperature of that step and separately passing a free oxygen bearing gas through the hot calcines to effect the substantially complete oxidation of the sulphur content thereof.

6. A process for treating siderite ore which comprises heating the ore to and maintaining it at a temperature above the decomposition temperature by the action of circulating in contact therewith substantially pure oxides of carbon preheated to a temperature above 600° C., thereby releasing further oxides of carbon from the ore and maintaining an atmosphere consisting substantially of oxides of carbon; continuously withdrawing oxides of carbon from contact with the ore and purifying and separating the impurities therefrom; preheating a portion of the purified gas and returning said preheated portion to the decomposition step of the process to maintain the requisite temperature of that step and separately passing a free oxygen bearing gear through the hot calcines to effect the substantially complete oxidation of the sulphur content thereof and introducing a reducing gas in sufficient quantity to effect the substantially complete reduction of iron oxides to metallic iron.

ALEXANDER THOMAS STUART.

CERTIFICATE OF CORRECTION.

Patent No. 2,197,085.            April 16, 1940.

ALEXANDER THOMAS STUART.

It is hereby certified that error appears in the printed specification of the above numbered patent requiring correction as follows: Page 3, second column, line 49, claim 6, for the word "gear" read --gas--; and that the said Letters Patent should be read with this correction therein that the same may conform to the record of the case in the Patent Office.

Signed and sealed this 9th day of July, A. D. 1940.

(Seal)                                      Henry Van Arsdale,
Acting Commissioner of Patents.